United States Patent
Dove

(10) Patent No.: US 10,142,704 B2
(45) Date of Patent: Nov. 27, 2018

(54) DEVICE SPECIFIC LOGO ACTIVATION

(71) Applicant: DISH Technologies L.L.C., Englewood, CO (US)

(72) Inventor: Antony Dove, Bradford (GB)

(73) Assignee: DISH Technologies L.L.C., Englewood, CO (US)

( * ) Notice: Subject to any disclaimer, the term of this patent is extended or adjusted under 35 U.S.C. 154(b) by 472 days.

(21) Appl. No.: 14/466,255

(22) Filed: Aug. 22, 2014

(65) Prior Publication Data

US 2016/0057506 A1 Feb. 25, 2016

(51) Int. Cl.
| | |
|---|---|
| *H04N 5/445* | (2011.01) |
| *H04N 5/44* | (2011.01) |
| *H04N 21/81* | (2011.01) |
| *H04N 21/426* | (2011.01) |
| *H04N 21/435* | (2011.01) |
| *H04N 21/61* | (2011.01) |
| *H04N 5/64* | (2006.01) |
| *H04N 21/6543* | (2011.01) |

(52) U.S. Cl.
CPC ........... *H04N 21/8146* (2013.01); *H04N 5/64* (2013.01); *H04N 21/426* (2013.01); *H04N 21/435* (2013.01); *H04N 21/6143* (2013.01); *H04N 21/6543* (2013.01)

(58) Field of Classification Search
CPC . H04N 21/426; H04N 21/435; H04N 21/6143
USPC .... 348/589, 563, 465, 461, 553; 725/32, 36, 725/40, 42, 43
See application file for complete search history.

(56) References Cited

U.S. PATENT DOCUMENTS

| | | | |
|---|---|---|---|
| 3,354,565 A | 11/1967 | Emmons et al. | |
| 5,202,677 A | 4/1993 | Parker et al. | |
| 5,532,753 A * | 7/1996 | Buchner | H04N 5/44513 348/468 |
| 6,665,966 B1 | 12/2003 | Beck | |
| 7,337,024 B1 | 2/2008 | Graham | |
| 2002/0175944 A1 | 11/2002 | Kolde et al. | |
| 2004/0263377 A1 | 12/2004 | Risi et al. | |
| 2010/0242070 A1 | 9/2010 | Matsubayashi | |
| 2011/0122554 A1 | 5/2011 | Ramrattan | |
| 2012/0216228 A1* | 8/2012 | Padi | H04N 21/4622 725/46 |
| 2013/0207916 A1 | 8/2013 | Koo et al. | |
| 2014/0143070 A1* | 5/2014 | DeVree | G06Q 30/0277 705/14.73 |

(Continued)

FOREIGN PATENT DOCUMENTS

CN 103 279 221 A 9/2013

OTHER PUBLICATIONS

International Preliminary Report on Patentability for PCT/GB2015/052433 dated Mar. 9, 2017, all pages.

(Continued)

*Primary Examiner* — Michael Lee
*Assistant Examiner* — Jean W Desir
(74) *Attorney, Agent, or Firm* — Kilpatrick Townsend & Stockton LLP

(57) ABSTRACT

Preferred or preferential logo activation, where a particular logo may become active or activated, in response to a command to do so, so that the status of a particular logo may change from a visually imperceptible or unseen state to visually perceptible or seen state.

20 Claims, 7 Drawing Sheets

(56) References Cited

U.S. PATENT DOCUMENTS

2014/0337880 A1* 11/2014 Sorbel .................. H04N 21/812
                                                      725/34
2014/0347172 A1    11/2014 Wan et al.

OTHER PUBLICATIONS

International Search Report and Written Opinion for PCT/GB2015/052433 dated Oct. 23, 2015, 16 pages.

* cited by examiner

DEVICE SPECIFIC LOGO ACTIVATION

BACKGROUND

A logo such as a symbol or design may be adopted by a particular entity to identify that entity or a particular product, for example, supplied or otherwise provided by that entity. However, it is contemplated herein that any particular logo may only be applicable or even relevant at certain times or in certain situations or scenarios. The features or aspects of the present disclosure are thus directed to preferred or preferential logo activation.

SUMMARY

In an aspect, a television receiver may include or comprise a housing, at least one processor mounted within the housing, and at least one memory element mounted within the housing and communicatively coupled with and readable by at least one processor and having stored therein processor-readable instructions that, when executed by the at least one processor, cause the at least one processor to: detect a command to activate a logo for display on a particular surface of the housing by changing a state of the logo from a visually imperceptible state to a visually perceptible state; coordinate, in response to detection of the command, one or more resources of the television receiver to exhibit a particular state to enable the television receiver to activate the logo for display on the particular surface of the housing; and activate the logo for display on the particular surface of the housing by changing the state of the logo from the visually imperceptible state to the visually perceptible state.

In an aspect, a method may include or comprise: detecting, at a television receiver, a command to activate a logo for display on a particular surface of the television receiver by changing a state of the logo from a visually imperceptible state to a visually perceptible state; coordinating, by the television receiver in response to receiving the command, one or more resources of the television receiver to exhibit a particular status to enable the television receiver to activate the logo for display on the particular surface; and activating, by the television receiver, the logo for display on the particular surface by changing the state of the logo from the visually imperceptible state to the visually perceptible state.

In an aspect, a method may include or comprise: detecting, by a computing device, a command to activate a logo for display on a particular surface of the computing device by changing a state of the logo from a visually imperceptible state to a visually perceptible state, wherein the command to activate the logo for display is generated by a timer incorporated within the computing device in response to expiration of a particular time period or received by the computing device from a resource external the computing device via a network connection; coordinating, by the computing device in response to detection of the command, one or more resources of the computing device to exhibit a particular state to enable the computing device to activate the logo for display on the particular surface, the one or more resources selected from a panel that when retracted exposes the logo for display and an electrical component that when activated sources current through a resistive network to heat a material positioned to the particular surface to generate the logo for display; and activating, by the computing device, the logo for display on the particular surface by changing the state of the logo from the visually imperceptible state to the visually perceptible state.

Other aspects are possible.

DETAILED DESCRIPTION

Figure 1:
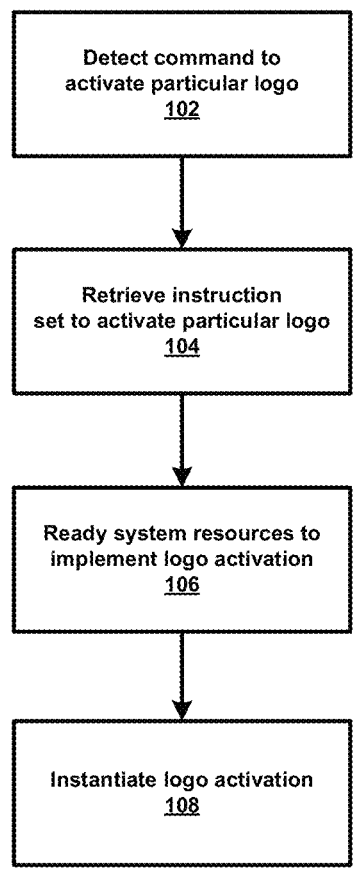
FIG. 1 shows an example method according to the disclosure.

The present disclosure is directed to or towards preferred or preferential logo activation. Here, any particular logo may become "active" or "activated" in response to a command to do so, so that the particular logo may become visually perceptible. Accordingly, the term "activate" or "activated" as used herein may refer to a process of changing the status of a particular logo from visually imperceptible or "unseen," to visually perceptible or "seen." It is contemplated that such an implementation may be applicable in many different scenarios.

For example, it is contemplated that the features or aspects of the present disclosure may be applicable to the automotive industry. For example, in many parts of the world vehicle emissions testing is mandatory, so as to reduce or otherwise minimize emission of pollutants that might be harmful to the environment. In the United States, for example, emissions testing for certain vehicles is an annual event, and is in general tied to vehicle registration and/or tab renewal. In this example, a sticker or tab may be issued that then may be placed to a license plate as evidence of "passing" emissions testing. Here, instead of the manual process of placing the sticker or tab to the license plate, it is contemplated that a command in software may instantiate a process to activate a logo in a lower right hand corner of a windshield, for example, that of which may serve as evidence of passing emissions testing. In this example, the activated logo may be time limited so as to expire following passage of one (1) year, consistent with the annual nature of emissions testing. It will thus be appreciated that such a time period may, or may not, be implementation-specific.

As yet another example, it is contemplated that the features or aspects of the present disclosure may be applicable to the satellite television industry. For example, in many instances, a particular vendor may wish to place their logo to each and every piece of equipment provided for use by a particular customer or customer base. An example of such equipment may include a set-top-box, sometimes referred to as a television receiver. Here, instead of a manual process of placing a decal, sticker, or the like, to a particular television receiver, for example, it is contemplated that a command in software may instantiate a process to activate a particular logo so that the same is displayed or exhibited by a particular television receiver, that of which may serve as a symbol that identifies the television receiver as being provided by that particular vendor. In some instances too, a particular television receiver may be customized so as to exhibit a particular logo based upon the preferences of an owner of the particular television receiver. This may, among other things, serve to entice new customers to subscribe to services as offered by a particular satellite television provider, as well as provide an incentive for existing customers to maintain their loyalty and/or relationship with the particular satellite television provider.

It will be appreciated that still many other examples as to the applicability of the features or aspects of the present disclosure are possible. For purpose of discussion though, the features or aspects of the present disclosure are introduced in the context of a satellite television implementation. Although not so limited, an appreciation of the various aspects of the present disclosure may be gained from the following discussion in connection with the drawings. For instance, referring now to FIG. 1, an example method 100 is shown in accordance with the present disclosure.

At step 102, a television receiver may detect a command to activate a particular logo, so that the same may ultimately be displayed or exhibited by the television receiver itself. In some examples, the command may be sourced or otherwise generated by the television receiver itself. In other examples, the command may be sourced or otherwise generated by a system or device other than the television receiver, and may be sent or transferred to the television receiver over a network communication link. At step 104, the television receiver may retrieve a particular instruction set to activate the particular logo. In some examples, the particular instruction set may be retrieved by the television receiver from persistent memory of the television receiver itself. In other examples, the particular instruction set may be retrieved by the television receiver from a resource external the television receiver, over a network communication link. Accordingly, at step 102 and/or step 104, a command and/or corresponding instructions to activate a particular logo as discussed in the context of the present disclosure may be retrieved from a particular resources integral to the television receiver itself, or from a network-accessible resource external the television receiver. Such an implementation may be beneficial and/or advantageous in many respects.

For example, in some instances a particular customer may not necessarily have a terrestrial network connection, and thus their television receiver would not be network-connected in this manner. Here, the television receiver itself may activate a particular logo in accordance with the principles of the present disclosure, even though television receiver is not connected to a terrestrial network. As another example, the television receiver itself may be configured and/or arranged to activate a first particular logo and then, depending on the particular situation or scenario, the television receiver may be configured and/or arranged to activate a second particular logo in response to a command and/or instructions received from a source external television receiver. Here, the second particular logo might be considered to be an "update" of the first particular logo. In other examples, the second particular logo might be wholly different than the first particular logo.

At step 106, the television receiver may make ready one or more internal system resources or components in order to implement activation of the particular logo. In general, and as discussed in further detail below, it is contemplated that a mechanism for activation of the particular logo may be electrical, mechanical, or chemical in nature, or any combination thereof. Accordingly, the television receiver may set or coordinate certain physical or tangible components of the television receiver to exhibit a particular status, configuration, arrangement etc., in order to enable activation of the particular logo. At step 108, in response to a "ready" status signal or the like, the television receiver may implement activation of the particular logo so that the same is displayed or exhibited by the television receiver. Such an implementation as discussed in connection with FIG. 1 may be beneficial and/or advantageous in many respects. For example, such an implementation may address logistical issues associated with delayed brand acceptance, branding changes, notifications related to hacked or warranty voided devices, notifications of out of warranty or extended warranty devices, subscription status, and etc. Further scenarios and beneficial aspects associated with preferred or preferential logo activation are described in detail below in connection with FIGS. 2-7.

Figure 2:
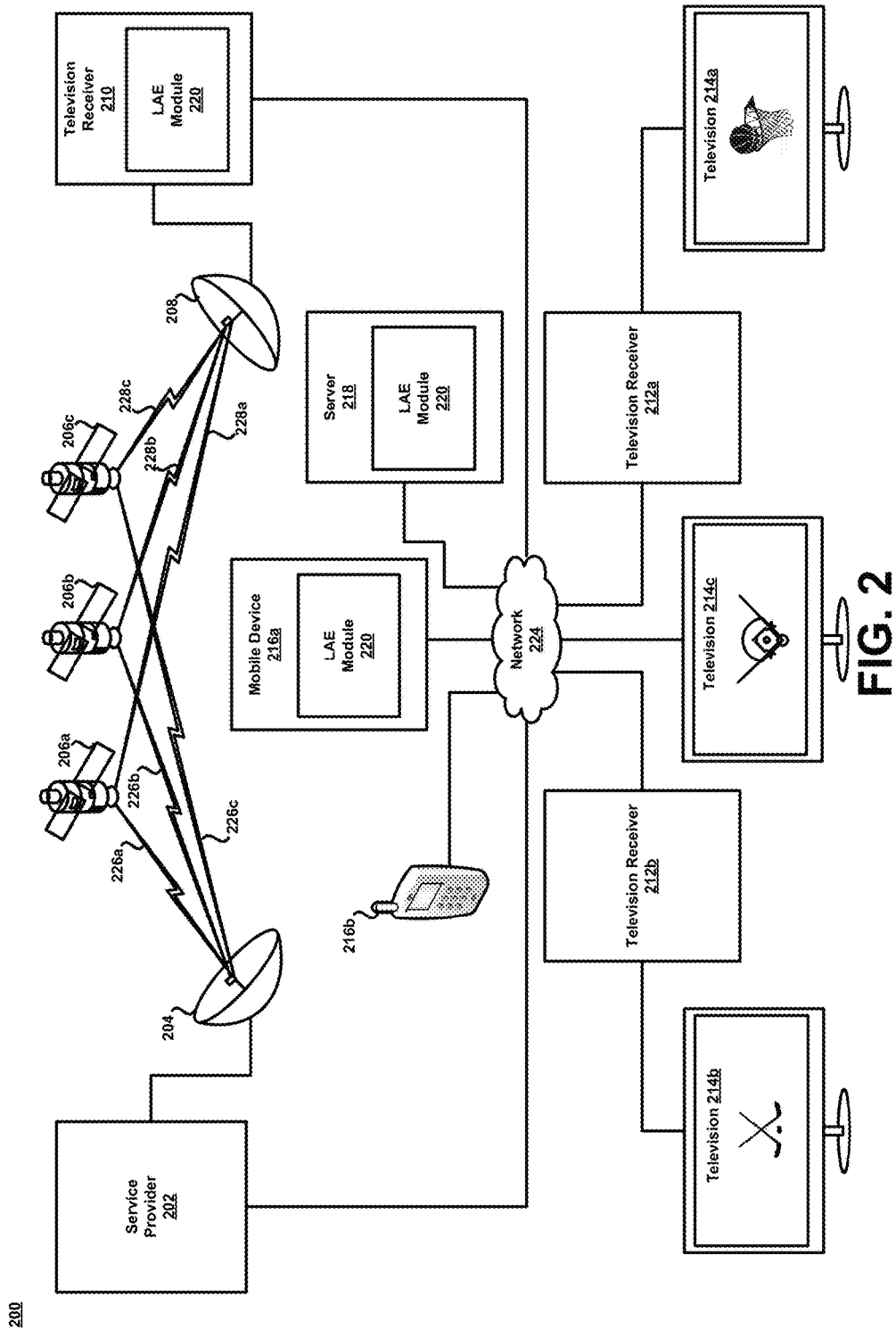
FIG. 2 shows an example content distribution system according to the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may be associated with the service provider 202. Additionally, at least the PTR 210, each of the computing devices 216a-b, and the server 218 may include an LAE (Logo Activation Engine) module 220. In general, the LAE module 220 may be configured and/or arranged to implement various features or aspects of the present disclosure associated with preferred or preferential logo activation.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214*a* by way of the STR 212*a* in accordance with a particular content protection technology and/or networking standard. Still further, the satellite dish 208 and the PTR 210 may, respectively, be configured to receive, decode, and relay at least one premium television channel to one or each of the computing devices 216*a-b*. Similar to the above-examples, the television channel may generally be presented live, or from a recording as previously stored on the PTR 210, and may be output to one or both of the computing devices 216*a-c* in accordance with a particular content protection technology and/or networking standard.

Figure 3:
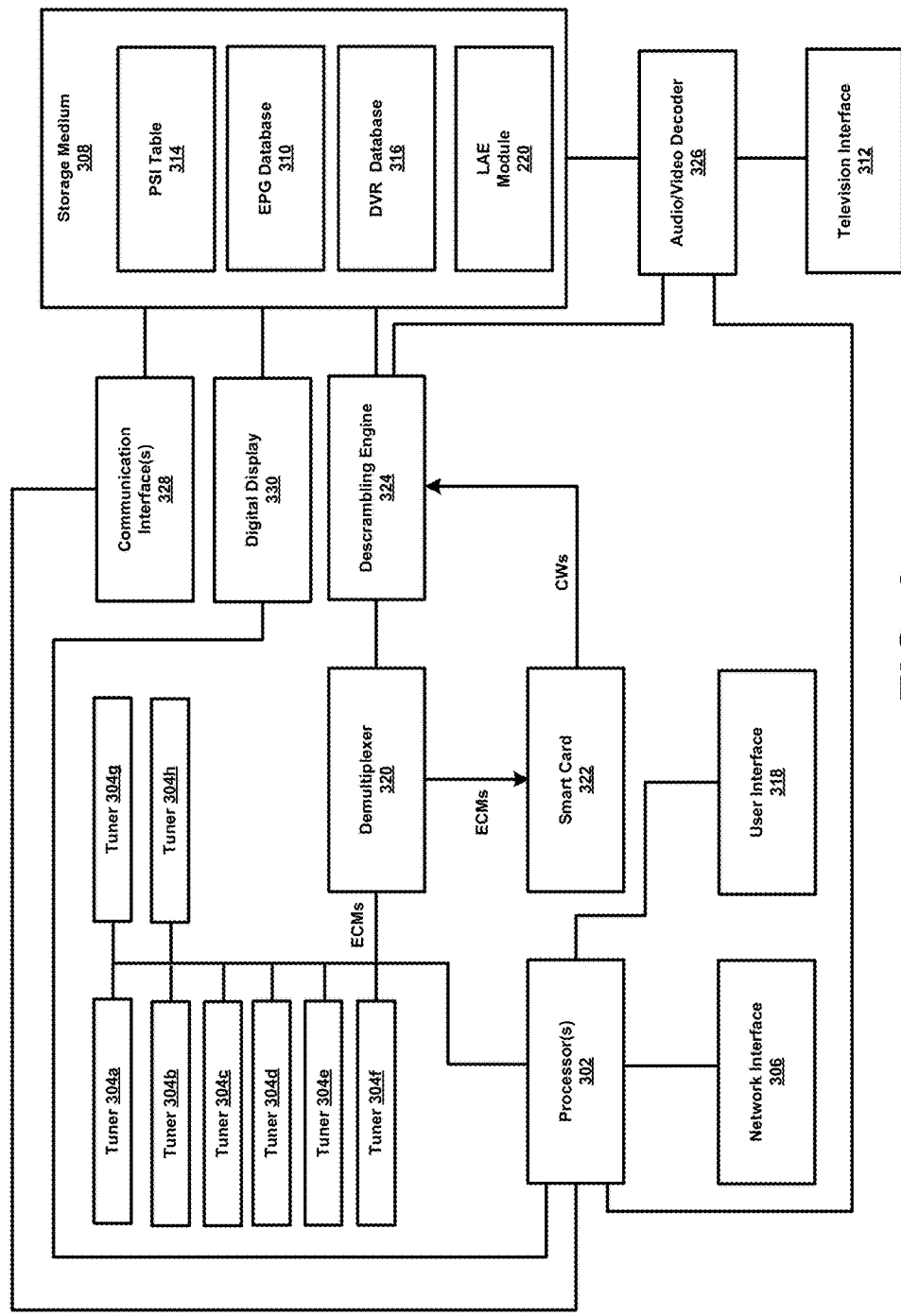
FIG. 3 shows an example block diagram of a television receiver of FIG. 2.

Referring now to FIG. 3, an example block diagram of the PTR 210 of FIG. 2 is shown in accordance with the disclosure. In some examples, the STRs 312*a-b* may be configured in a manner similar to that of the PTR 210. In some examples, the STRs 312*a-b* may be configured and arranged to exhibit a reduced functionality as compared to the PTR 210, and may depend at least to a certain degree on the PTR 210 to implement certain features or functionality. The STRs 312*a-b* in this example may be each referred to as a "thin client."

The PTR 210 may include one or more processors 302, a plurality of tuners 304*a-h*, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, at least one communication interface 328, and at least one digital display 330. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites 306*a-c*. Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 306*a-c*, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the LAE module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206*a-c* of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 245 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing devices 216a-b as shown in FIG. 2. It is contemplated that the communication interface 328 may take or exhibit any form as desired, and may be configured in a manner so as to be compatible with a like component or element incorporated within or to the computing devices 216a-b, and further may be defined such that the communication link may be wired and/or or wireless. Example technologies consistent with the principles or aspects of the present disclosure may include, but are not limited to, Bluetooth®, WiFi, NFC (Near Field Communication), and/or any other communication device or subsystem similar to that discussed in connection with FIG. 7. The digital display 330 of the PTR 210 may be used or utilized to display a particular logo in a manner similar to that discussed below in connection with at least FIG. 5.

For brevity, the PTR 210 is depicted in a simplified form, and may generally include more or fewer elements or components as desired, including those configured and/or arranged for implementing various features associated with preferred or preferential logo activation. For example, the PTR 210 is shown in FIG. 3 to include the LAE module 220 as mentioned above in connection with FIG. 2. While shown stored to the storage medium 308 as executable instructions, the LAE module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
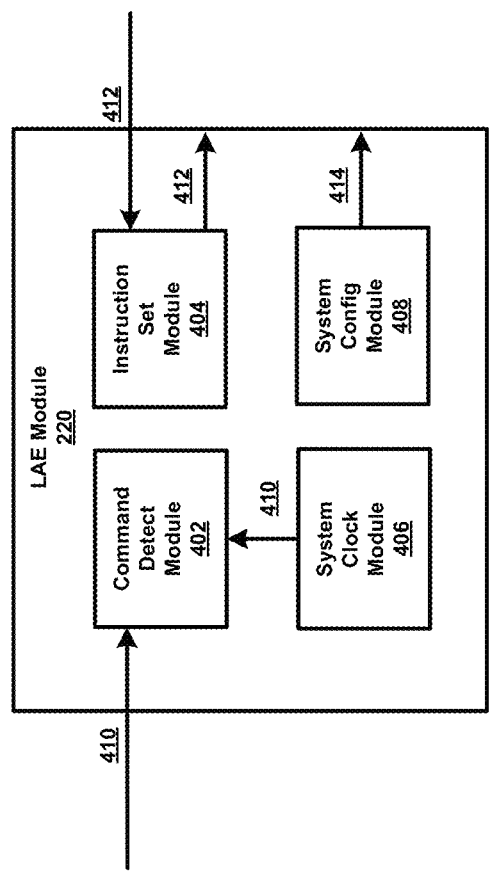
FIG. 4 shows first example aspects of the system of FIG. 2 in detail.

Referring now to FIG. 4, first example aspects of the system 200 of FIG. 2 are shown in detail. In particular, FIG. 4 depicts a number of modules, including a command detect module 402, an instruction set module 404, a system clock module 406, and a system configuration module 408, of an instance of the LAE module 220 of FIG. 2. The configuration of the LAE module 220 as shown in FIG. 4 is just an example. Other examples may include more or fewer modules as desired, and may or may not be implementation-specific.

In practice, the command detect module 402 may detect a command 410 to activate a particular logo, so that the same may ultimately be displayed or exhibited by the PTR 210. An example of a particular logo displayed or exhibited by the PTR 210 is shown and described below in connection with FIG. 5. Next, the LAE module 220 may retrieve a particular instruction set 412 from the instruction set module 404 to activate the particular logo. Based upon the particular instruction set 412, the system configuration module 408 may ready one or more internal system resources or components of the PTR 210 in order to implement activation of the particular logo. Last, the LAE module 220 may in response to a ready command 414 as received from system configuration module 408 implement activation of the particular logo in accordance with the present disclosure. Here, it is contemplated that the ready command 414 may be generated by the system configuration module 408 upon confirmation by the system configuration module 408 that one or more physical or tangible components of the PTR 210 exhibit a particular status, configuration, arrangement etc., in order to perfect or otherwise complete activation of the particular logo by the PTR 210.

Similar to that mentioned above in connection with FIG. 1, in some examples, the command 410 may be sourced or otherwise generated by the PTR 210 itself. For example, the command detect module 402 may receive as input the command 410 as generated by the clock module 406. It is contemplated that the command 410 may be generated by the clock module 406 in response to detection or onset of a particular date/time. For example, at a time of manufacture of the PTR 210, the clock module 406 may be programmed to generate the command 410 at a particular MM/DD/YR; HR/MIN/SEC (e.g., 07/28/2015; 8 AM). Similarly, it is contemplated that the command 410 may be generated by the clock module 406 in response to detection of passage of a particular time period. For example, at a time of initialization of the PTR 210 at particular residence or domicile, the clock module 406 may be programmed to generate the command 410 following passage of a particular number of days, and at a certain time (e.g., 365 days; 8 AM Local Time). Still many other examples are possible.

For example, the command 410 may be sourced or otherwise generated by a system or device other than the PTR 210, and may be sent or transferred to the PTR 210 over a network communication link. In this example, the command detect module 402 may receive as input, via the network 224, the command 410 as generated by the LAE module 220 of the server 218 (see FIG. 2). It is contemplated that the command 410 may be generated by the LAE module 220 of the server 218 in response to detection of passage of a particular time period. For example, at a time of initialization of the PTR 210 at particular residence or domicile, the LAE module 220 of the server 218 may be programmed to generate the command 410 following passage of a particular number of days, and at a certain time (e.g., 30 days; 12 AM). Similarly, it is contemplated that the command 410 may be generated by the LAE module 220 of the server 218 in response to detection of the same of a request to download (i.e., to the PTR 210) and activate a particular logo. The particular logo in this example may not necessarily be a logo that is associated with a particular vendor that provides the PTR 210. Rather, the particular logo may, for example, be associated with a favorite sports team, or the like. An example of such a "customization" implementation or feature is shown and described in further detail below.

Much like the command 410, in some instances, the particular instruction set 412 may be stored or loaded to the instruction set module 404 at a time of manufacture of the PTR 210. Here, the particular instruction set 412 may include instructions that when executed by the PTR 210 enables the PTR 210 to activate a particular logo that is associated with a particular vendor that provides the PTR 210. In other examples though, the particular instruction set 412 may be stored or loaded to the instruction set module 404 as received from the LAE module 220 of the PTR 210. Here, the particular instruction set 412 may include instructions that when executed by the PTR 210 enables the PTR 210 to activate a particular logo that is not necessarily associated with a particular vendor that provides the PTR 210. Rather, the particular logo may, for example, be associated with a favorite sports team, or the like, as mentioned above.

Figure 5:
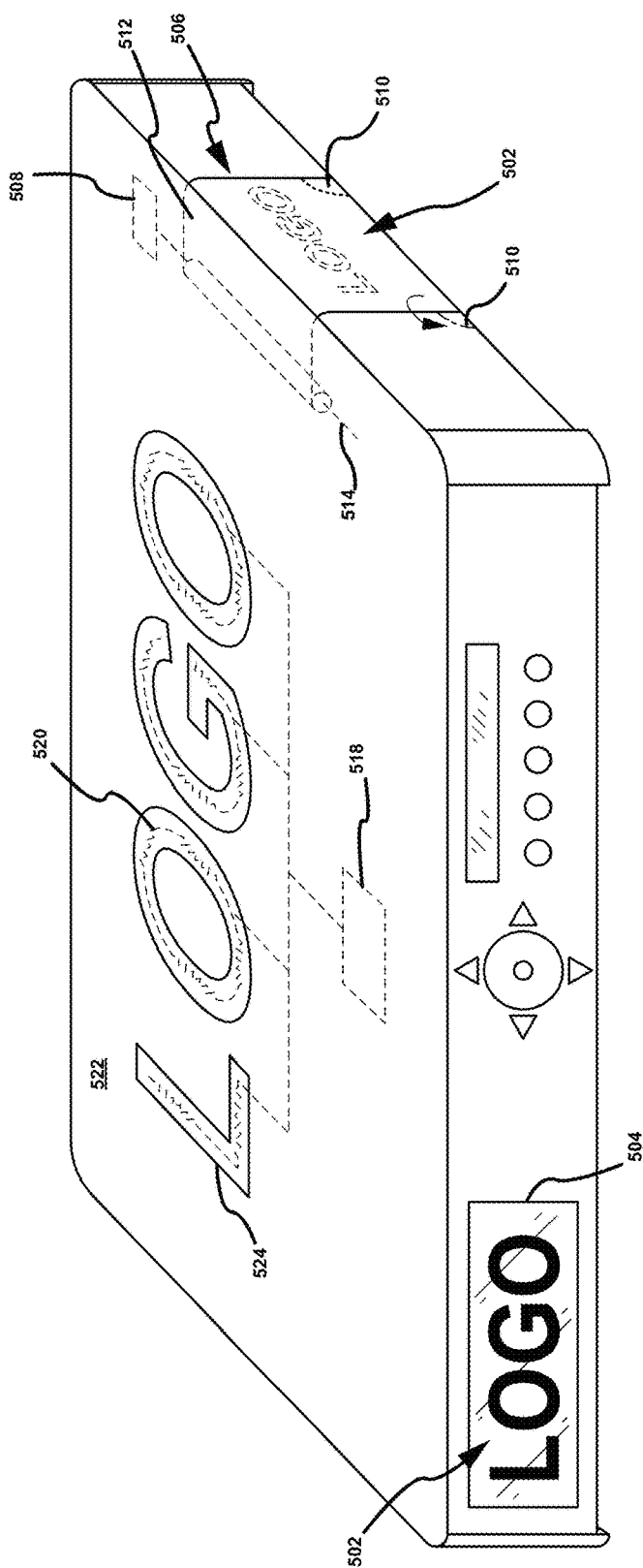
FIG. 5 shows second example aspects of the system of FIG. 2 in detail

Referring now to FIG. 5, second example aspects of the system 200 of FIG. 2 are shown in detail. In particular, FIG. 5 depicts a particular logo 502 displayed or exhibited by the PTR 210 on various surfaces of the same when "activated." As mentioned above, the term "activate" or "activated" may refer to one or more steps or a process of changing the status of a particular logo, i.e., particular logo 502, from being visually imperceptible, or unseen, to visually perceptible, or seen. Also as mentioned above, it is contemplated that a mechanism for activation of any particular logo may be electrical, mechanical, or chemical in nature, or any combination thereof.

An example of electrical logo activation is indicated in FIG. 5 via digital display 504 incorporated to or within or on the PTR 210. Here, as part of a logo activation process or procedure, the LAE module 220 of the PTR 210 may power-on the digital display 504, load or queue various firmware and/or software instructions, etc., so as to output for display the particular logo 502 on the digital display 504. It will be appreciated that, in this example, the particular logo 502 may not necessarily be static or still, but could be dynamic or animated, etc. The electrical logo activation shown and described in connection with FIG. 5 is just an example. Other examples are possible.

An example of mechanical logo activation is indicated in FIG. 5 via element 506. Here, as part of a logo activation process or procedure, the LAE module 220 of the PTR 210 may power-on various components of the PTR 210, such as a motor element 508, and also disconnect a number of fixation clips 510 internal the PTR 210 (indicated by intermittent line in FIG. 5) from a flexible panel 512, so that the flexible panel 512 may ultimately be retracted and wrapped onto a spindle 514 in order to expose or activate the particular logo 502. It will be appreciated that, in this example, the particular logo 502 may comprise a decal, sticker, molded feature or badge, etc., and may be installed to the PTR 210 at a time of manufacture. The mechanical logo activation shown and described in connection with FIG. 5 is just an example. Other examples are possible.

An example of chemical logo activation is indicated in FIG. 5 via element 516. Here, as part of the activation procedure, the LAE module 220 of the PTR 210 may power-on various components of the PTR 210, such as a current source 518, so that once current is switched so as to pass through a resistive ladder network 520 internal and adjacent a surface 522 of the PTR 210, a heat-sensitive material 524 may be heated so as to change or modify its chemical make-up to activate the particular logo 502. It will be appreciated that, in this example, the heat-sensitive material 524 may comprise of a temperature sensitive tape that changes color when heated, and that the color of the temperature sensitive tape when heated may contrast with a color of the surface 522 of the PTR 210 so as to be distinguished from the color of the surface 522 of the PTR 210. The chemical logo activation shown and described in connection with FIG. 5 is just an example. Other examples are possible.

Figure 6:
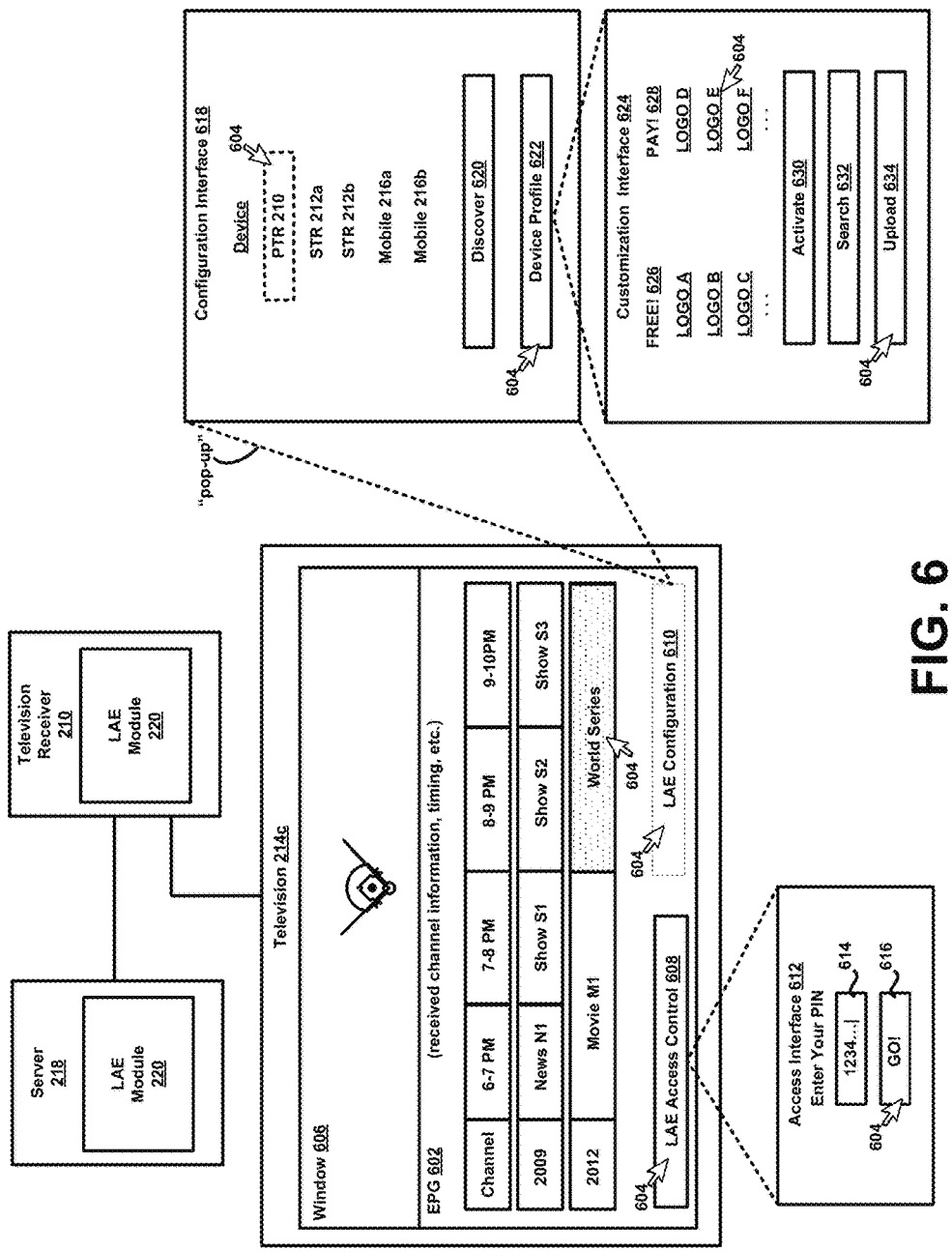
FIG. 6 shows third example aspects of the system of FIG. 2 in detail

Referring now to FIG. 6, third example aspects of the system 200 of FIG. 2 are shown in detail. In particular, the PTR 210 may be configured and/or arranged to output an EPG (Electronic Programming Guide) 602 to and for presentation the television 214*c*, for example. The EPG 602 may at least present various information related to television channels and the timing of programs or programming appearing on such television channels. For example, as shown in FIG. 6, the EPG 602 may display information associated with a channel 2012, where the "World Series" is listed as scheduled to appear on that channel starting at a particular time on a particular day, and etc. In this example, and assuming that a current time is sometime during the time period 8-10 PM, a viewer may manipulate a cursor 604 using a pointing device (not shown) to select, as indicated by stipple shading in FIG. 6, the World Series for immediate viewing within a window 606 on the television 214*c*. Other examples are possible. For example, it is contemplated that any menu-driven navigation technique or implementation may be used to enable user-interaction with the EPG 602, along with any other elements or interfaces output by the PTR 210 to the television 214*c*.

In addition to the EPG 602, the PTR 210 may be configured and/or arranged to output various other interactive elements or interfaces. For example, the LAE module 220 of the PTR 210 may be configured to output a control selection 608 and a configuration selection 610, as shown in FIG. 6. In general, the control selection 608 may be considered an access control mechanism to prevent those who may not necessarily be authorized from accessing functionality associated with the configuration selection 610. In particular, the control selection 608 may be selected in order to gain access to a particular interface so that the LAE module 220 of any particular system or device as shown in FIG. 2 may be customized so as to exhibit a particular logo in accordance with the principles of the present disclosure. For example, a particular individual may manipulate the cursor 604 to select the control selection 608, via a "point and double-click" action, for example and, in response, the LAE module 220 of the PTR 210 may output an access interface 612 to and for presentation by the television 214*c*. In this example, the access interface 612 may include a prompt "Enter Your PIN" along with a data field 614 and an enter selection 616. Here, the particular individual may enter into the data field 614 an alphanumeric sequence, or the like, and then select the enter selection 616 in effort to gain access to functionality associated with the configuration selection 610.

Assuming that the above-mentioned alphanumeric sequence is authenticated by the LAE module 220 of the PTR 210 following the described sequence, the configuration selection 610 may become "active" so that upon selection of the same a configuration interface 618 may be output to and for presentation by the television 214*c*. In FIG. 6, the configuration selection 610 is shown as "inactive," indicated by a perimeter line that is weighted less than that of the control selection 608, or by a perimeter line that is lighter in terms of boldness than that of the control selection 608. When the configuration selection 610 becomes active the perimeter line of the same would be similar to that of the control selection 608 as shown in FIG. 6.

Again, assuming that the alphanumeric sequence is authenticated by the LAE module 220 of the PTR 210 following the described sequence, the particular individual may manipulate the cursor 604 to select the configuration selection 610 and, in response, the LAE module 220 of the PTR 210 may output the configuration interface 618 to and for presentation by the television 214c. Here, it is contemplated that the particular individual may utilize the configuration interface 618 to configure the LAE module 220 of any particular device, as desired, so as to implement one or more features or aspects of the present disclosure. For instance, in one example, the configuration interface 618 may include a device discover selection 622 and a device profile selection 622. The configuration interface 628 as shown in FIG. 6 is just an example. Other examples may include more or fewer "selections" as desired, and may be implementation-specific.

In practice, the device discover selection 620 may be selected to pair or otherwise establish a communication link or connection between the PTR 210 and any of the other devices as introduced in FIG. 2 that may have installed thereto a corresponding LAE module 220. When successfully "paired," a corresponding device may be listed, possibly persistently, within the configuration interface 618. For example, as shown in FIG. 6, the device discover selection 620 may be selected to pair or otherwise establish a communication link or connection between the PTR 210 and the mobile device 216a, and then an indicator that identifies the mobile device 216a is shown within the configuration interface 618. In this manner, an individual may interact with the television 214c, and ultimately the PTR 210, to program or configure at least the mobile device 216a, as desired, to implement various features or aspects of the present disclosure. In other examples, the configuration interface 618 may be accessed directly via the mobile device 216a in a manner similar to that discussed in connection with FIG. 6.

Next, but not necessarily so, the individual may utilize the configuration interface 618 to customize the PTR 210 so as to exhibit a particular logo in accordance with the principles of the present disclosure. For example, the indicator that identifies the PTR 210 as shown within the configuration interface 618 may initially be selected and, in response, the LAE module 220 of the PTR 210 may output a customization interface 624 to and for presentation by the television 214c. In this example, a first column 626 within the customization interface 624 may itemize one or more logos that may be downloaded to the PTR 210 for activation, without payment of fee, in accordance with the present disclosure. Additionally, a second column 628 within the customization interface 624 may itemize one or more logos that may be downloaded to the PTR 210 for activation upon payment of fee in accordance with the present disclosure.

For example, it is contemplated that any particular logo as itemized within the first column 626 or the second column 628 within the customization interface 624 could itself comprise a URL (Uniform Resource Locator) that when selected instantiates a process whereby an instruction set associated with the same may be downloaded from the server 218 to the LAE module 220 of the PTR 210. Once the download is complete and confirmed (e.g., via a "Download Complete" indicator, not shown), an activate button 630 within the customization interface 624 may be selected to activate the particular logo as downloaded. For example, the downloaded instruction set when executed by the LAE module 220 of the PTR 210 may power-on the digital display 504 of FIG. 5, load or queue various firmware and/or software instructions, etc., so as to output for display the particular logo on the digital display 504.

It is further contemplated that, when any particular logo as itemized within the first column 626 or the second column 628 within the customization interface 624 is not something that might be consider of-interest to the individual, a search button 632 within the customization interface 624 may be selected to enable the individual to perform a search for a particular logo. In some examples, the LAE module 220 of the PTR 210 may in response to selection of the search button 632 output an interface similar to the access interface 612 to enable the individual to perform a search for a particular logo. Still further, it contemplated that the individual may upload their own image or video to the LAE module 220 of the PTR 210, via selection of an upload button 634, that which may be output for display on the digital display 504. Here, following selection of the upload button 634, the individual may navigate a local disk or drive or memory location (e.g., associated with one or both of the computing devices 216a-b), select a particular file, and then activate the logo (i.e., image or video) in accordance with the principles of the present disclosure.

As mentioned above, the various features or aspects of the present disclosure are directed to or towards preferred or preferential logo activation. Specifically, any particular logo may become active or activated in response to a command to do so, as part of a process of changing the status of a particular logo from visually imperceptible or unseen, to visually perceptible or seen. In the context of a satellite television implementation, a piece of equipment such as a set-top-box or television receiver may include or otherwise exhibit at least one of an electrical, mechanical, and chemical mechanism that when engaged may activate a particular logo accordingly. This may, among other things, serve to entice new customers to subscribe to services as offered by a particular satellite television provider, as well as provide an incentive for existing customers to maintain their loyalty and/or relationship with the particular satellite television provider. Other advantages or benefits may include enabling a supplier to have the ability to alter a particular unit after or following sale of the same. In some instance, the change or alteration may be anticipated, in others a particular logo for activation may be after the sale and then downloaded and activated accordingly. These and other benefits and/or advantages may be realized in a number of different ways.

For instance, a television receiver may include or comprise a housing, at least one processor mounted within the housing, and at least one memory element mounted within the housing and communicatively coupled with and readable by at least one processor and having stored therein processor-readable instructions. The processor-readable instructions when executed by the at least one processor may cause the at least one processor to detect a command to activate a logo for display on a particular surface of the housing by changing a state of the logo from a visually imperceptible state to a visually perceptible state. It is contemplated that the particular surface is integral to the housing in that the particular surface is part of the housing itself, and/or a particular element or component incorporated into the housing. The processor-readable instructions when executed by the at least one processor may cause the at least one processor to coordinate, possibly in response to detection of the command, one or more resources of the television receiver to exhibit a particular state to enable the television receiver to activate the logo for display on the particular surface of the housing, and activate the logo for display on the particular surface of the housing by changing the state of the logo from the visually imperceptible state to the visually perceptible state. It is contemplated that the one or more resources may include software, firmware, and hardware resources, and any combination thereof so that the television receiver may make ready the one or more resources in order to activate the logo for display.

In some examples, the processor-readable instructions when executed by the at least one processor cause the at least one processor to retract a panel to expose the logo for display on the particular surface. In some examples, the processor-readable instructions when executed by the at least one processor cause the at least one processor to source current through a resistive network to heat a material positioned to the particular surface of the housing to activate the logo for display on the particular surface. In some examples, the processor-readable instructions when executed by the at least one processor cause the at least one processor to power-on a display screen integral with the particular surface of the housing to activate the logo for display on the particular surface. Here, the one or more resources may include software, firmware, and hardware resources, and any combination thereof so that the television receiver may make ready the one or more resources in order to retract a panel to expose the logo for display on the particular surface, source current through a resistive network to heat a material positioned to the particular surface of the housing to activate the logo for display on the particular surface, and/or power-on a display screen integral with the particular surface of the housing to activate the logo for display on the particular surface.

In some examples, the command to activate the logo for display is generated by a timer incorporated within the housing of the television receiver in response to expiration of a particular time period. It is contemplated that the particular time period is configurable, and thus the timer may programmed as desired as to instantiate or generate the command to activate the logo for display in response to expiration of a particular time period. In some examples, the command to activate the logo for display is received by the television receiver from a resource external the television receiver via a network connection. It is contemplated that the command in this example may be one of manually generated, such as via an explicit user-input to generated the command and send the send to the television receiver, and "automatically" generated, without explicit or direct user-input, such as in response to expiration of a particular time period similar to that discussed above in connection with the "timer" of the television receiver.

In some examples, an instruction set to coordinate the one or more resources of the television receiver to exhibit the particular state to enable the television receiver to activate the logo for display on the particular surface of the housing may be retrieved by the television receiver from a local persistent memory location. It is contemplated that such an instruction may be stored to the local persistent memory location at a time of manufacture of the television receiver for example. In some examples, an instruction set to coordinate the one or more resources of the television receiver to exhibit the particular state to enable the television receiver to activate the logo for display on the particular surface of the housing may be received by the television receiver from a resource external the television receiver via a network connection. It is contemplated that such an instruction set may thus be pushed to the television receiver at any particular time during the service lifetime of the television receiver, at any particular time at which the television receiver has at least intermittent access to a network via the network connection.

In some examples, the logo is a decal or sticker positioned to the particular surface. In some examples, the logo is a molding or badge incorporated within the particular surface. It is contemplated that a molding is a feature integral with or formed into the particular surface, whereas a badge is a molding-like feature affixed to the particular surface by at least one fastener or a fastener mechanism. In some example, the logo comprises a heat-sensitive material positioned to the particular surface at a time of manufacture of the television receiver. It is contemplated that the heat-sensitive material upon reaching a particular temperature may change, via chemical reaction, "color" from a first color (e.g., black) to a second color (e.g., red) so that the second color is distinguished from a color of the television receiver itself In some examples, the television receiver may make ready at least one passive and/or at least one active electrical component of the television receiver to exhibit a corresponding particular status to enable the television receiver to activate the logo for display on the particular surface. An example of a passive electrical component may include a current or power source for example. Such component may be considered passive in some contexts in that its output does not substantially change during operation. For example, a current source when activated may be configured and/or arranged to source about 10 mA, for instance, of current during operation. An example of an active electrical component may include a digital display for example. Such component may be considered active in some contexts in that its output may or may not substantially change during operation. For example, a particular digital display may output for display a first particular logo for a period of time and then output for display another particular logo for another period of time. It is contemplated that any logo may be "static" or unchanging during display thereof or "dynamic" or changing (e.g., animated) during display thereof. Other benefits and/or advantages may be realized in a number of different ways that which may be understood and appreciated in light of the present disclosure in its entirety.

Figure 7:
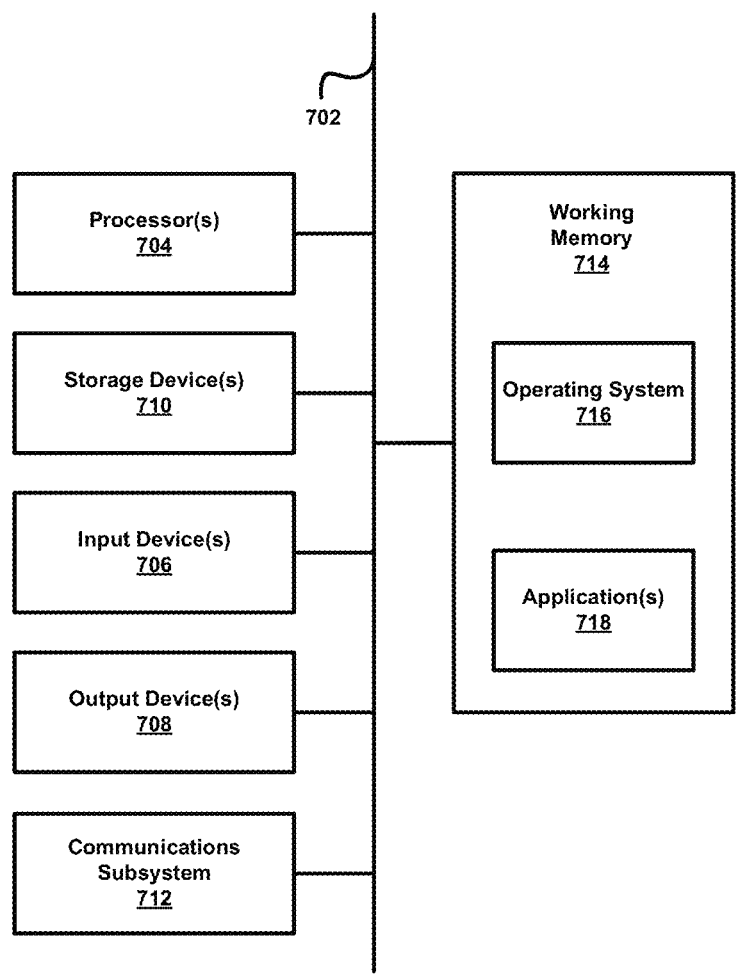
FIG. 7 shows an example computing system or device.

FIG. 7 shows an example computer system or device 700 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2. In this manner, any of one or more of the respective elements of at least FIG. 2 may be configured and/or arranged, wholly or at least partially, to implement preferred or preferential logo activation as discussed in the context of the present disclosure. For example, any of one or more of the respective elements of at least FIG. 2 may be configured and/or arranged to perform and/or include instructions that, when executed, perform the method of FIG. 1. Still further, any of one or more of the respective elements of at least FIG. 2 may be configured to perform and/or include instructions that, when executed, instantiate and implement functionality of the PTR 210 and/or the computing devices 216a-b and/or the server 218.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many examples, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 700) to perform methods in accordance with various examples of the disclosure. According to a set of examples, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion or manner. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television receiver, comprising:
    a housing;
    at least one processor mounted within the housing;
    one or more tuners for receiving television programming content, the one or more tuners mounted within the housing and communicatively coupled to the at least one processor;
    a digital display screen for displaying digital logo images, wherein the digital display screen is located at a surface of the housing, and wherein the digital display screen includes a heat-sensitive material;
    an output interface for outputting audio and video content to a display device, wherein the output interface is communicatively coupled to the at least one processor, and wherein the display device is a separate device from the digital display screen; and
    at least one memory element mounted within the housing and communicatively coupled with and readable by the at least one processor and having stored therein processor-readable instructions that, when executed by the at least one processor, cause the at least one processor to perform operations including:
        generating an output signal at the output interface, wherein the output signal encodes for an electronic programming guide that includes a menu item for selection of logos to be displayed on the digital display screen;
        detecting input corresponding to selection of the menu item;
        modifying the output signal to generate, from the electronic programming guide, a logo selection menu for identifying a logo to be displayed on the digital display screen;
        detecting input corresponding to selection of a particular logo;
        detecting a command to activate the particular logo for display on the digital display screen;
        obtaining, in response to detection of the command, an instruction set corresponding to the particular logo, wherein the instruction set includes commands for outputting the particular logo on the digital display screen; and
        outputting, by the digital display screen, a digital logo image corresponding to the particular logo, wherein outputting includes causing current to pass through a resistive ladder network adjacent to the surface of the housing to heat the heat-sensitive material and modify the chemical make-up of the digital display screen.

2. The television receiver of claim 1, wherein the television receiver further includes a panel covering a second logo, wherein the panel is located at the surface of the housing, and wherein the operations further include:
    mechanically retracting the panel to expose the second logo for display on the surface of the housing.

3. The television receiver of claim 1, wherein the television receiver further comprises a temperature sensitive material positioned at the surface of the housing, and wherein the operations further include:
    sourcing current through a resistive network to increase a temperature of the temperature sensitive material positioned at the surface of the housing to activate a second logo for display on the surface, wherein the second logo comprises the temperature sensitive material, and wherein the temperature sensitive material changes from a first color to a second color when the temperature is increased.

4. The television receiver of claim 1, wherein the particular logo corresponds to a custom logo uploaded to the television receiver by a user.

5. The television receiver of claim 1, wherein:
the command to activate the particular logo for display is generated by a timer of the television receiver in response to expiration of a particular time period.

6. The television receiver of claim 1, wherein:
the command to activate the particular logo for display is received by the television receiver from a resource external to the television receiver via a network connection.

7. The television receiver of claim 1, obtaining the instruction set includes retrieving the instruction set from a local persistent memory location of the television receiver.

8. The television receiver of claim 1, obtaining the instruction set includes receiving the instruction set via a network connection.

9. The television receiver of claim 1, wherein the particular logo corresponds to a static image.

10. The television receiver of claim 1, wherein the particular logo corresponds to a dynamic image.

11. The television receiver of claim 1, wherein the particular logo corresponds to a video.

12. A method, comprising:
generating, by a television receiver, an output signal for use by a display device, wherein the output signal encodes for an electronic programming guide that includes a menu item for selection of logos to be displayed on a digital display screen located at a surface of a housing of the television receiver, wherein the display device is a separate device from the digital display screen, and wherein the digital display screen includes heat-sensitive material;
detecting, by the television receiver, input corresponding to selection of the menu item;
modifying, by the television receiver, the output signal to generate, from the electronic programming guide, a logo selection menu for identifying a logo to be displayed on the digital display screen;
detecting, by the television receiver, input corresponding to selection of a particular logo;
detecting, by the television receiver, a command to activate the particular logo for display on the digital display screen;
obtaining, by the television receiver in response to receiving the command, an instruction set corresponding to the particular logo, wherein the instruction set includes commands for outputting the particular logo on the digital display screen; and
outputting, by the television receiver and on the digital display screen, a digital logo image corresponding to the particular logo, wherein outputting includes causing current to pass through a resistive ladder network adjacent to the surface of the housing to heat the heat-sensitive material and modify the chemical make-up of the digital display screen.

13. The method of claim 12, further comprising:
mechanically retracting a panel covering a second logo to expose the second logo for display on the surface of the housing.

14. The method of claim 12, further comprising:
sourcing current through a resistive network to increase a temperature of a temperature sensitive material positioned at the surface of the housing to activate a second logo for display on the surface, wherein the second logo comprises the temperature sensitive material, and wherein the temperature sensitive material changes from a first color to a second color when the temperature is increased.

15. The method of claim 12, wherein the particular logo corresponds to a custom logo uploaded to the television receiver by a user.

16. The method of claim 12, further comprising:
receiving, by the television receiver, a command to download the instruction set, free-of-charge, from a resource external to the television receiver; and
downloading, by the television receiver over a network connection, the instruction set.

17. The method of claim 12, further comprising:
receiving, by the television receiver, a command to download the instruction set from a resource external to the computing device; and
downloading, by the television receiver over a network connection, the instruction set upon payment of a fee.

18. The method of claim 12, wherein the particular logo corresponds to a static image.

19. The method of claim 12, wherein the particular logo corresponds to a dynamic image or a video image.

20. A method, comprising:
generating, by a television receiver, an output signal for use by a display device, wherein the output signal encodes for an electronic programming guide that includes a menu item for selecting logos to be displayed on a digital display screen located at a surface of a housing of the television receiver, wherein the display device is a separate device from the digital display screen, and wherein the digital display screen includes a heat-sensitive material;
detecting, by the television receiver, input corresponding to selection of the menu item;
modifying, by the television receiver, the output signal to generate, from the electronic programming guide, a logo selection menu for identifying a logo to be displayed on the digital display screen;
detecting, by the television receiver, input corresponding to selection of a particular logo;
retrieving, from a local persistent memory location of the television receiver, an instruction set stored to the local persistent memory location at a time of manufacture of the television receiver, wherein the instruction set is associated with the particular logo, and wherein the instruction set includes commands for outputting the particular logo on the digital display screen integral with the particular surface of the housing;
detecting, by the television receiver, expiration of a particular time period; and
outputting, by the television receiver in response to detection of the expiration of the particular time period and on the digital display screen, a digital logo image corresponding to the particular logo, wherein outputting includes causing current to pass through a resistive ladder network adjacent to the surface of the housing to heat the heat-sensitive material and modify the chemical make-up of the digital display screen.

* * * * *